July 6, 1965     D. J. GOGUEN ETAL     3,192,631

SHAFT ALIGNMENT APPARATUS

Filed June 29, 1962     2 Sheets-Sheet 1

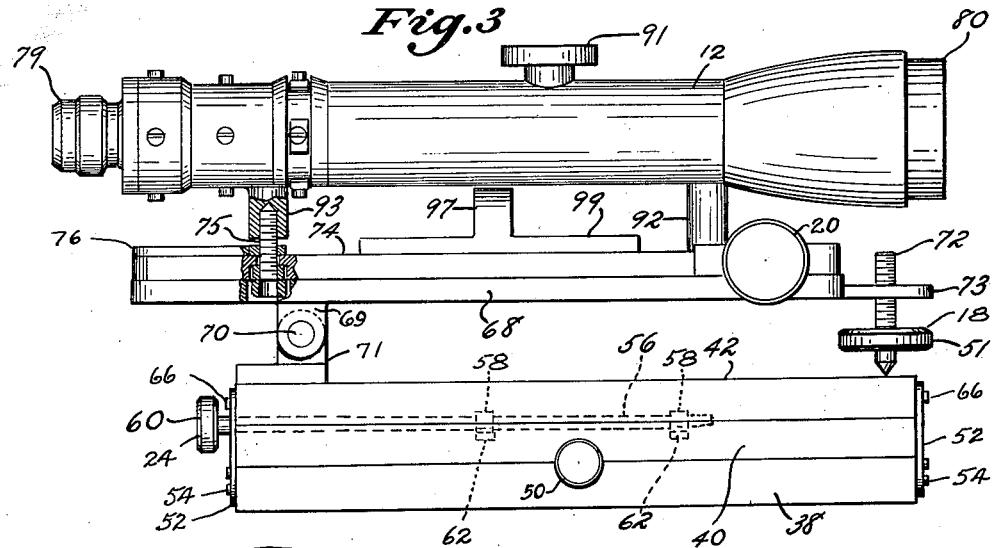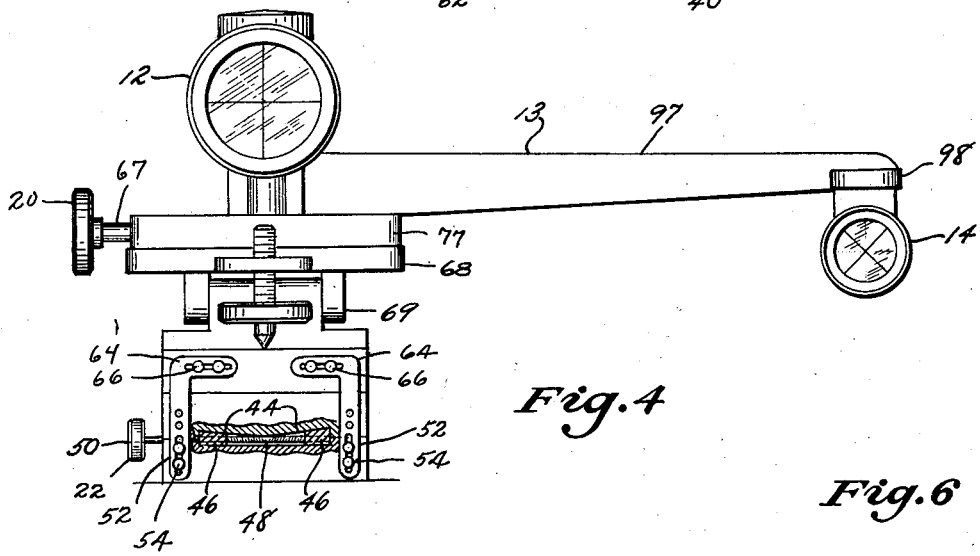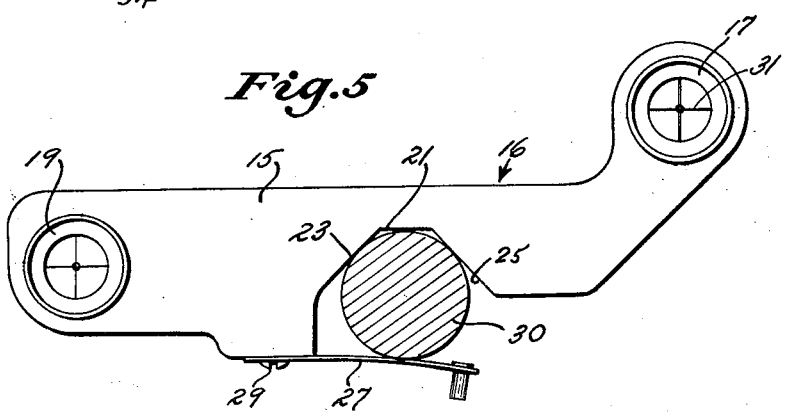

United States Patent Office 3,192,631
Patented July 6, 1965

3,192,631
SHAFT ALIGNMENT APPARATUS
Donald J. Goguen, Mattapan, and John J. Coleman, Rockland, Mass., assignors to C. L. Berger & Sons, Inc., Boston, Mass., a corporation of Massachusetts
Filed June 29, 1962, Ser. No. 206,288
2 Claims. (Cl. 33—46)

This invention relates generally to the shaft alignment apparatus, and more particularly to shaft alignment apparatus in which optical means are utilized to provide extremely high accuracy.

Various means and devices have been used for checking the trueness, or straightness, of elongated shafts, among which is one utilizing a taut wire. Such devices are reasonably satisfactory for relatively short shafts or for relatively crude alignment of long shafts, but with any shaft length, where a high degree of alignment accuracy is required, the sagging of the wire, produced by gravity, causes substantial departures from accuracy.

It is therefore among the objects of the present invention to provide optical shaft aligning construction which is suitable for use in connection with relatively long shifts.

Because shaft misalignment can be set up undesirable stresses in bearings, the use of the present apparatus is not limited to testing for trueness or straightness of the shaft, but may be used also for the setting of bearings supporting the shaft so that the shaft may be a true running one.

It is desirable that the present apparatus be useful with shafts of varying lengths, and it is therefore among the objects of the invention to produce a device in which the telscopes have a long or large focal range, extending, for example, from two feet to infinity.

A feature of the invention lies in the fact that the use of the present apparatus is easy and convenient. This results in a substantial saving of time during an actual alignment operation.

Another object herein lies in the provision of structure of the class described, utilizing two telescopes in combination to prevent an erroneous reading, which could occur owing to a slight rotation of the target element, or having the effect of tending to compensate for an actual misalignment.

Thus the present invention provides a novel system or method, as well as apparatus, for not only determining the state of alignment of, but also to afford a means for directing the adjustment of, the bearings and/or shaft itself.

These objects, and other identical ends and advantages, will more fully appear in the progress of this disclosure and be pointed out in the appended claims.

In the drawings, in which similar reference characters designate corresponding parts throughout the several views:

FIGURE 3 is a side elevational view as seen from the right side of FIGURE 1.

FIGURE 4 is a front elevational view.

FIGURE 5 is an enlarged fragmentary sectional view as seen from the plane 5—5 on FIGURE 1.

FIGURE 6 is a side elevational view as seen from the right of FIGURE 5.

Figure 1:
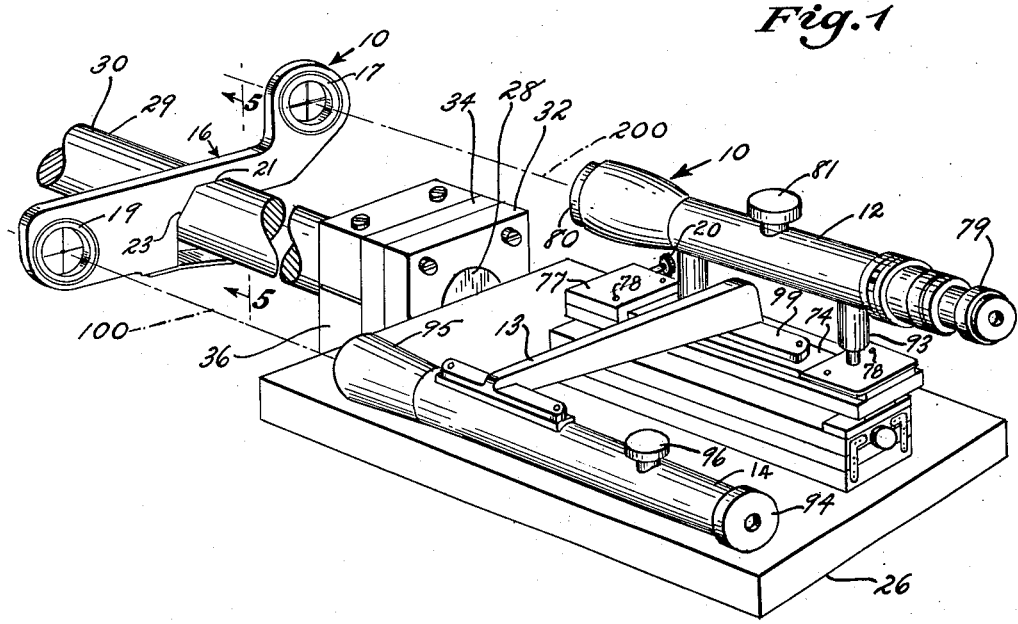
FIGURE 1 is a view in perspective showing a preferred embodiment of the invention.
Figure 2:
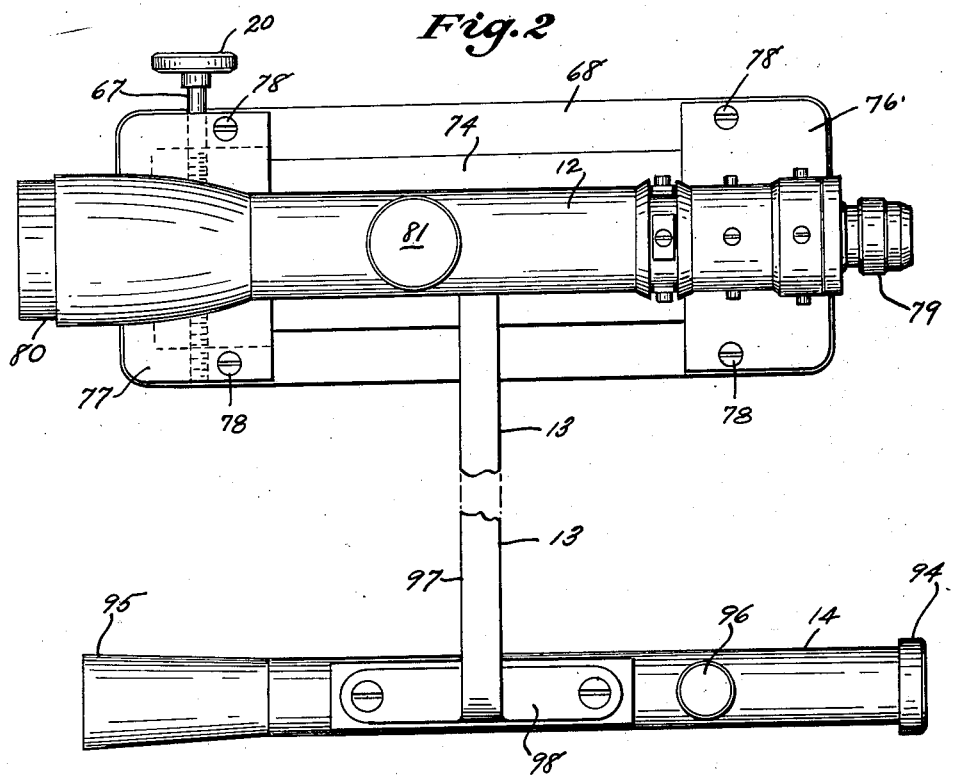
FIGURE 2 is a fragmentary plan view of a portion of the apparatus shown in FIGURE 1.

In accordance with the invention, the apparatus, generally indicated by reference character 10, comprises broadly: a main telescope element 12; interconnecting means 13; an auxiliary telescope element 14; a target element 16; arcuate vertical position adjusting means 18; arcuate horizontal position adjusting means 20; rectilinear elevating means 22; rectilinear lateral shifting means 24; and base fixture means 26.

The base fixture means 26 may be of suitable shape and size to act as a support for the structure thereabove, and also to connect to the near end 28 of a shaft 30 with which the apparatus 10 is used. It is preferable to connect to the shaft, and, as shown in FIGURE 1, the base fixture means has an integral bracket 32 which is connected to a flange 34 on shaft 30. The near end 28 of shaft 30 may be journalled in a bearing 36. As will be understood by those skilled in the art to which the present invention relates, the shaft may be of any desired length, with a chosen number of bearings and inter-bearing spacing, and since this is conventional it is not particularly illustrated in the drawings.

Thus the base fixture means, because it is fixed in position with respect to the shaft, acts as a reference point.

The rectilinear elevating means and rectilinear lateral shifting means as shown include a bottom plate 38, an intermediate plate 40, and a top plate 42. The opposed inner faces of plates 38 and 40 have angled surfaces 44 which coact with the wedges 46 so that as screw 48 is turned by knob 50, the intermediate plate is raised or lowered rectilinearly, constrained by the guides 52 and headed pins 54. Journalled in the lower portion of the plate 42 is a spindle 56 on which are fixed a pair of pinions 58. The rear end of spindle 56 has a knob 60. The pinions 58 ride on and mesh with transverse racks 62 recessed and secured to the upper portion of the intermediate plate 40, so that spindle 56 is turned by the knob 60, the top plate 42 is rectilinearly shifted from side to side, constrained by the guides 64 and headed pins 66.

It may be noted at this point that the plates 38, 40 and 42 may be omitted with a loss of their functions, and this may be done where the parts thereabove are directly connected to the base fixture means 26 in a precise and predetermined manner, as where the apparatus 10 will be repeatedly used with an identical shaft 30 structure and arrangement.

The arcuate vertical position adjusting means 18 as shown includes a tiltable plate 68, the ears 69 of which are connected by the pivot 70 to the bracket 71 which projects up from the plate 42. Tilt is controlled by a screw 72 which threadedly engages an extension 73 of the front end of plate 68 and bears on plate 42.

The arcuate horizontal position adjusting means 20 as shown includes a turnable plate 74, which is pivotally mounted at the pivot 75 on rear piece 76, and is horizontally shiftable by a screw 67 which is journalled in the front piece 77 and threadedly engages the forward end (not shown) of plate 74. Pieces 76 and 77 are attached to plate 68 by screws 78.

The alignment or main telescope element 12 is of relatively higher power, preferably with a magnification of twenty-five times, and may be of a well-known type including an eye-piece 79, an objective 80, and focusing knob 81. It is supported at its forward portion by the upright 92, and at its rear portion on the post 93 which engages the pivot 75.

The spotting or auxiliary telescope element 14 is of relatively lower power, preferably with a magnification of twelve times, and may be of a well-known type including an eyepiece 94, an objective 95 and a focusing knob 96. It is supported by the interconnecting means 13. The means preferably includes an elongated arm 97 and a pair of cross pieces 98 and 99. The piece 98 is screwed to the housing of element 14, and the piece 99 is screwed to the plate 74.

The telescope elements 12 and 14 may have suitable cross hairs as seen in FIGURE 4, preferably diagonally arranged, and have a large focusing range, preferably from twenty-six inches to infinity. The sight lines 100 and 200 (FIGURE 1) are spaced and parallel, with the line 200 substantially above line 100.

The target element 16 is of irregular shape as best seen in FIGURES 1, 5 and 6. It is preferably composed of a planar body 15 having a main target member 17 and an auxiliary target member 19 each including spaced parallel cross hairs 31, which are constructed and arranged to coincide exactly with the parallel sight lines 200 and 100, respectively.

The lower edge of the body 15 is provided with notch 21 having angularly arranged shaft contacting surfaces 23 and 25, which, while being arranged at 45° to horizontal, are 90° apart with respect to each other. A spring clamp 27 is pivotally connected to body 15 at 29 and is opposite the notch 21. Clamp 27 holds the target element 16 detachably on the shaft 30.

In use the target element 16 is placed on the far end 29 of the shaft 30, and the base fixture means 26 connected to the near end 28.

Depending upon the diameter of the shaft, the targets 17 and 19 will be placed a predetermined horizontal distance above the principal axis of the shaft, and this is compensated for, while sighting, by movement of the knob 50 to elevate or lower the telescope elements 12 and 14 to a corresponding level. The targets may be rotated about the shaft axis to obtain angular correspondence with the telescope elements, at this point.

Should the base fixture means 26 not be so positioned that the axis of the main telescope element directly overlies the axis of the target 17, this is compensated for by adjusting the rectilinear lateral shifting means 24.

Following this operation, sightings may be made through the auxiliary telescope with the target substantially at each end of the shaft, at which point, by sighting upon the target 19 any final adjustments of the elevating means 22 and lateral shifting means 24 may be made, since the auxiliary telescope has no means for adjustment, other than the focusing adjustment 96.

Upon again sighting through the main telescope element 12, should this not be directly sighted upon the target 17, there is an indication that the axes of both telescopes are not parallel, and the corrective adjustment for this is accomplished by shifting the cross hairs in the main telescope element, as is well known in the art. At this point, each telescope should be sighted directly upon its respective target.

As has been mentioned, the auxiliary telescope element 14 is of considerably less power than the main telescope element 12, and thus as the target is moved along the shaft in well known manner to a plurality of positions, initial sightings to determine horizontal alignment are made through the auxiliary telescope element, and when this target has been aligned, if the shaft is true, the target 17 will also be aligned with the main telescope element.

Since the element 16 is free to rotate about the axis of the shaft, it is possible to align one target with its respective telescope element, with only possible misalignment of the cross hairs. However, where this is performed with the auxiliary telescope element, owing to the larger magnification of the main telescope element, this rotation will be immediately sensed, and the target may be again accurately aligned to its original substantially horizontal plane. It will be observed that by using two telescopes and corresponding target areas, there is no need for aligning the telescopes with regard to a previously fixed target, or the use of a plumb bob means on the sighting target which must be constantly readjusted, as the target is moved toward the telescope elements. Manipulation and operation is thus materially simplified as contrasted with prior art devices which use only a single telescope element.

In the drawing, add suitable cross hatching to members 46 in FIGURE 4, as indicated in the enclosed sketch. This sketch also includes the proposed corrections to FIGURE 3, including the addition of reference characters 20, 50, and 69.

We wish it to be understood that we do not desire to be limited to the exact details of construction shown and described, for obvious modifications will occur to a person skilled in the art to which the present invention relates.

We claim:

1. Shaft alignment apparatus comprising: a main telescope element, an auxiliary telescope element, means mounting said telescope elements for parallel axial alignment with respect to one end of a shaft, a target element having a pair of target members disposed thereon in fixed mutual relation corresponding to the lateral displacement of the axes of said main and auxiliary telescope elements with respect to each other, and means for mounting said target element at selected points along said shaft and pivotally about the shaft axis, whereby upon the sighting through both telescope elements the target may be aligned to predetermined rotational position.

2. Structure in accordance with claim 1, in which the auxiliary and main telescope elements are of different magnification powers.

References Cited by the Examiner

UNITED STATES PATENTS

| | | | |
|---|---|---|---|
| 685,455 | 10/01 | Kinkead | 33—46 |
| 958,736 | 5/10 | Ferris | 33—46 |
| 1,048,570 | 12/12 | Murphy | 33—63 |
| 1,994,177 | 3/35 | Nolan | 33—46 |
| 2,285,281 | 6/42 | Johnson | 33—46 |
| 2,565,382 | 8/51 | Lemaire | 33—60 |

ROBERT B. HULL, *Primary Examiner.*